US012648505B2

(12) United States Patent
Cozza

(10) Patent No.: US 12,648,505 B2
(45) Date of Patent: Jun. 9, 2026

(54) SYSTEMS AND METHODS FOR MONITORING THE STATUS OF SHANK ASSEMBLIES OF AGRICULTURAL IMPLEMENTS

(71) Applicant: CNH Industrial America LLC, New Holland, PA (US)

(72) Inventor: Michael R. Cozza, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 682 days.

(21) Appl. No.: 17/990,129

(22) Filed: Nov. 18, 2022

(65) Prior Publication Data

US 2024/0164239 A1 May 23, 2024

(51) Int. Cl.
| | |
|---|---|
| *A01B 79/00* | (2006.01) |
| *A01B 35/08* | (2006.01) |
| *A01B 49/02* | (2006.01) |
| *A01B 63/24* | (2006.01) |

(52) U.S. Cl.
CPC ............ *A01B 79/005* (2013.01); *A01B 35/08* (2013.01); *A01B 63/24* (2013.01); *A01B 49/02* (2013.01)

(58) Field of Classification Search
None
See application file for complete search history.

(56) References Cited

U.S. PATENT DOCUMENTS

| | | | |
|---|---|---|---|
| 4,854,161 | A | 8/1989 | Drits |
| 7,689,394 | B2 | 3/2010 | Furem et al. |
| 9,405,039 | B2 | 8/2016 | Anderson |

| | | | |
|---|---|---|---|
| 9,485,900 | B2 | 11/2016 | Connell et al. |
| 9,554,098 | B2 | 1/2017 | Casper et al. |
| 9,670,649 | B2 | 6/2017 | Bewley et al. |
| 9,875,535 | B2 | 1/2018 | Finch et al. |
| 10,165,725 | B2 | 1/2019 | Sugumaran et al. |
| 10,262,206 | B2 | 4/2019 | Posselius |
| 12,078,988 | B2* | 9/2024 | Hurd .................... G05D 1/0274 |
| 2016/0134844 | A1 | 5/2016 | Casper et al. |
| 2016/0237640 | A1 | 8/2016 | Carpenter et al. |
| 2017/0094893 | A1* | 4/2017 | Rains .................... A01C 7/046 |
| 2017/0112043 | A1 | 4/2017 | Nair et al. |
| 2018/0220577 | A1 | 8/2018 | Posselius et al. |
| 2018/0336410 | A1 | 11/2018 | Posselius |

(Continued)

FOREIGN PATENT DOCUMENTS

| | | |
|---|---|---|
| WO | WO 2017/163822 | 9/2017 |
| WO | WO 2018/020310 | 2/2018 |

*Primary Examiner* — Jean Paul Cass
(74) *Attorney, Agent, or Firm* — Dority & Manning, P.A.

(57) ABSTRACT

In one aspect, a system for monitoring the status of shank assembly of agricultural implements includes a shank assembly configured to supported relative to an agricultural implement, the shank assembly including a shank. The system also includes a surface profile sensor configured generate data indicative of a surface profile of an aft portion of the field located rearward of the shank assembly relative to a direction of travel of the agricultural implement. Additionally, the system includes a controller communicatively coupled to the surface profile sensor. The controller is configured to monitor the data received from the surface profile sensor and determine an operating status of the shank assembly based at least in part on the surface profile of the aft portion of the field.

20 Claims, 7 Drawing Sheets

(56)        References Cited

U.S. PATENT DOCUMENTS

| 2018/0352718 | A1 |   | 12/2018 | Kovach et al. | |
|---|---|---|---|---|---|
| 2019/0059198 | A1 |   | 2/2019 | Schnaider et al. | |
| 2019/0110392 | A1 | * | 4/2019 | Gresch | A01C 21/00 |
| 2019/0124824 | A1 | * | 5/2019 | Hubner | A01C 7/203 |
| 2019/0208698 | A1 |   | 7/2019 | Maxton et al. | |
| 2019/0254223 | A1 |   | 8/2019 | Eichhorn et al. | |
| 2020/0260633 | A1 | * | 8/2020 | Kovach | A01B 71/02 |
| 2020/0344939 | A1 |   | 11/2020 | Sporrer et al. | |
| 2021/0105928 | A1 |   | 4/2021 | Henry | |
| 2023/0093751 | A1 | * | 3/2023 | Schroeder | G01L 5/00 |
| | | | | | 172/1 |
| 2024/0065131 | A1 | * | 2/2024 | Ellaboudy | G05D 1/242 |
| 2024/0164239 | A1 | * | 5/2024 | Cozza | A01B 63/24 |
| 2024/0303801 | A1 | * | 9/2024 | Sharma | G06K 19/0723 |

* cited by examiner

SYSTEMS AND METHODS FOR MONITORING THE STATUS OF SHANK ASSEMBLIES OF AGRICULTURAL IMPLEMENTS

FIELD OF THE INVENTION

The present subject matter relates generally to agricultural implements and, more particularly, to systems and methods for monitoring the status of shank assemblies of an agricultural implement (e.g., whether a given shank attachment member is installed relative to its respective shank or whether a given shank assembly is experiencing a trip/float event).

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Such residue may include materials left in the field after the crop has been harvested (e.g., stalks and stubble, leaves, and seed pods). Good management of field residue can increase efficiency of irrigation and control of erosion in the field.

Tillage implements typically include ground-engaging tools, such as shanks and shank attachment members (e.g., shank points, chisels, etc.), configured to condition the soil for improved moisture distribution while reducing soil compaction from sources such as machine traffic, grazing cattle, and standing water. The shank attachment members are typically replaceable and come in a wide variety of configurations to accommodate different field conditions and the desired results of the tilling operation. Unfortunately, when a shank attachment member falls off or otherwise decouples from its respective shank during operation, the shank attachment member is typically difficult to find and expensive to replace, and the shank may also need to be replaced if the implement is operated for an extended period without a shank attachment member, which further increases the cost of a lost shank attachment member.

Moreover, when performing a tillage operation, it is desirable to create a level and uniform layer of tilled soil across the field to form a proper seedbed for subsequent planting operations. However, rocks or other objects, as well as firm or compacted soil, in certain portions of the field may exert a great enough force on the ground engaging tools to overcome the biasing force applied to a given shank assembly to maintain such assembly at its home or default position. In this respect, the shank assembly may pivot relative to the implement frame such that the depth of soil penetration decreases. Such upward pivoting over a short period of time is typically referred to as a trip event whereas upward pivoting over an extended period of time is typically referred to as a float event. Trip/float events can result in an uneven seedbed.

Accordingly, a system and method for improved monitoring of shank assemblies configured for use with an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring the status of shank assemblies of agricultural implements. The system includes a shank assembly configured to supported relative to an agricultural implement, the shank assembly including a shank. The system also includes a surface profile sensor configured to generate data indicative of a surface profile of an aft portion of the field located rearward of the shank assembly relative to a direction of travel of the agricultural implement. Additionally, the system includes a controller communicatively coupled to the surface profile sensor. The controller is configured to monitor the data received from the surface profile sensor and determine an operating status of the shank assembly based at least in part on the surface profile of the aft portion of the field.

In another aspect, the present subject matter is directed to a method for monitoring the status of shank assemblies of agricultural implements. The method includes receiving, with a computing device, data indicative of a surface profile of an aft portion of a field located rearward of a shank assembly of an agricultural implement relative to a direction of travel of the agricultural implement. The method also includes analyzing, with the computing device, the surface profile of the aft portion of the field to determine an operating status of the shank assembly, and initiating, with the computing device, a control action based on the determined operating status of the shank assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
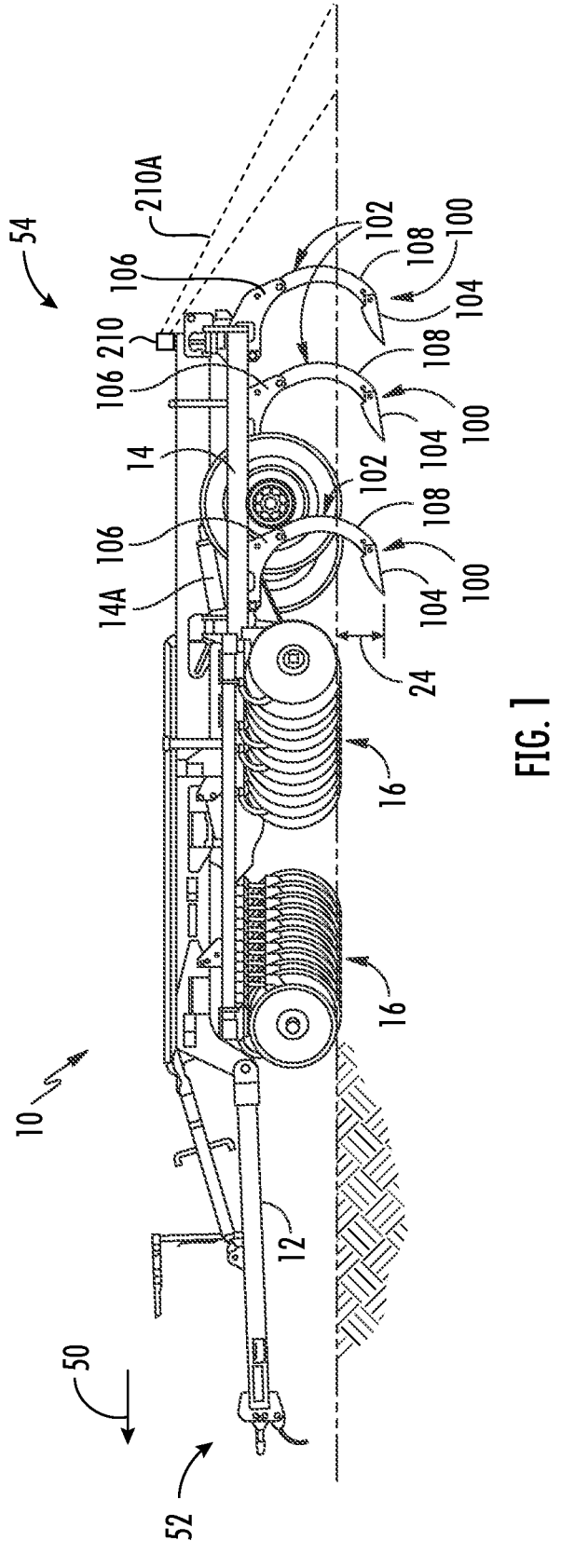
FIG. 1 illustrates a side view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the status of shank assemblies of an agricultural implement. Specifically, in several embodiments, the disclosed systems and methods may be used to monitor the installation status of shank attachment members (e.g., points, chisels, etc.) of shank assemblies of an agricultural implement. In one embodiment, the disclosed system may monitor the surface profile of the field behind the implement as the implement performs an operation to determine when the installation status of a shank attachment member has changed (e.g., when a shank point as fallen off). For instance, in accordance with aspects of the present subject matter, a surface profile sensor may be provided in association with the implement, with the surface profile sensor being configured to capture data indicative of the profile or contour of the field surface rearward of the implement. When a shank attachment member falls off or otherwise becomes decoupled from the shank of its respective shank assembly, the surface profile of the aft portion of the field located rearward of the respective shank assembly will change. Accordingly, a controller of the disclosed system may be configured to determine the installation status of shank attachment members of the tillage implement based on the detected surface profile of the field. Additionally, in some embodiments, the controller may further be configured to automatically initiate a control action in response to determining that a given shank attachment member is no longer installed relative to the shank of its respective shank assembly. For instance, in one embodiment, the control action may include providing an operator notification or adjusting the operation of one or both of the tillage implement and/or the work vehicle towing the implement (e.g., stopping operation of the vehicle/implement). In addition, or as an alternative thereto, the control action may be associated with identifying the location of the shank attachment member that has fallen off its respective shank assembly, such as by mapping or georeferencing the location at which it was initially detected that shank attachment member was missing or by physically tagging or marking the field at the expected location of the missing shank attachment member.

In addition to monitoring the installation status of shank attachment members, the disclosed system and method may also be configured to monitor the operating status of a shank assembly by detecting when the shank assembly is experiencing a trip/float event. In one embodiment, the disclosed system may monitor the surface profile of the field behind the implement as the implement performs an operation to determine when a given shank assembly is experiencing a trip/float event. For instance, in accordance with aspects of the present subject matter, a surface profile sensor may be provided in association with the implement, with the surface profile sensor being configured to capture data indicative of the profile or contour of the field surface rearward of the implement. When a shank assembly is experiencing a trip/float event, the surface profile of the aft portion of the field located rearward of the respective shank assembly will change. Accordingly, a controller of the disclosed system may be configured to determine whether a shank assembly is experiencing a trip/float event based on the detected surface profile of the field. Additionally, in some embodiments, the controller may further be configured to automatically initiate a control action in response to determining that a given shank assembly is experiencing a trip/float event. For instance, in one embodiment, the control action may include providing an operator notification or adjusting the operation of one or both of the tillage implement and/or the work vehicle towing the implement (e.g., stopping operation of the vehicle/implement). In addition, or as an alternative thereto, the control action may be associated with identifying the location of the trip/float event, such as by mapping or georeferencing the location of the event or by physically tagging or marking the field at the location of the event.

As will be described below, each shank assembly of a tillage implement may, in certain instances, create a V-shaped surface feature within the field having an anticipated shape or dimensions (e.g., an expected width or depth). However, when the shank attachment member of a shank assembly falls off or when a shank assembly is experiencing a trip/float event, the shape or dimensions of such surface feature will change. For instance, the surface feature may become shallower or deeper (or wider or narrower) than during normal operating conditions. Accordingly, a controller of the disclosed system may be configured to determine the operating status of shank assemblies based on the detected surface profile of the field aft of the implement, particularly the detected surface features aligned with respective shank assemblies of the implement.

Figure 2:
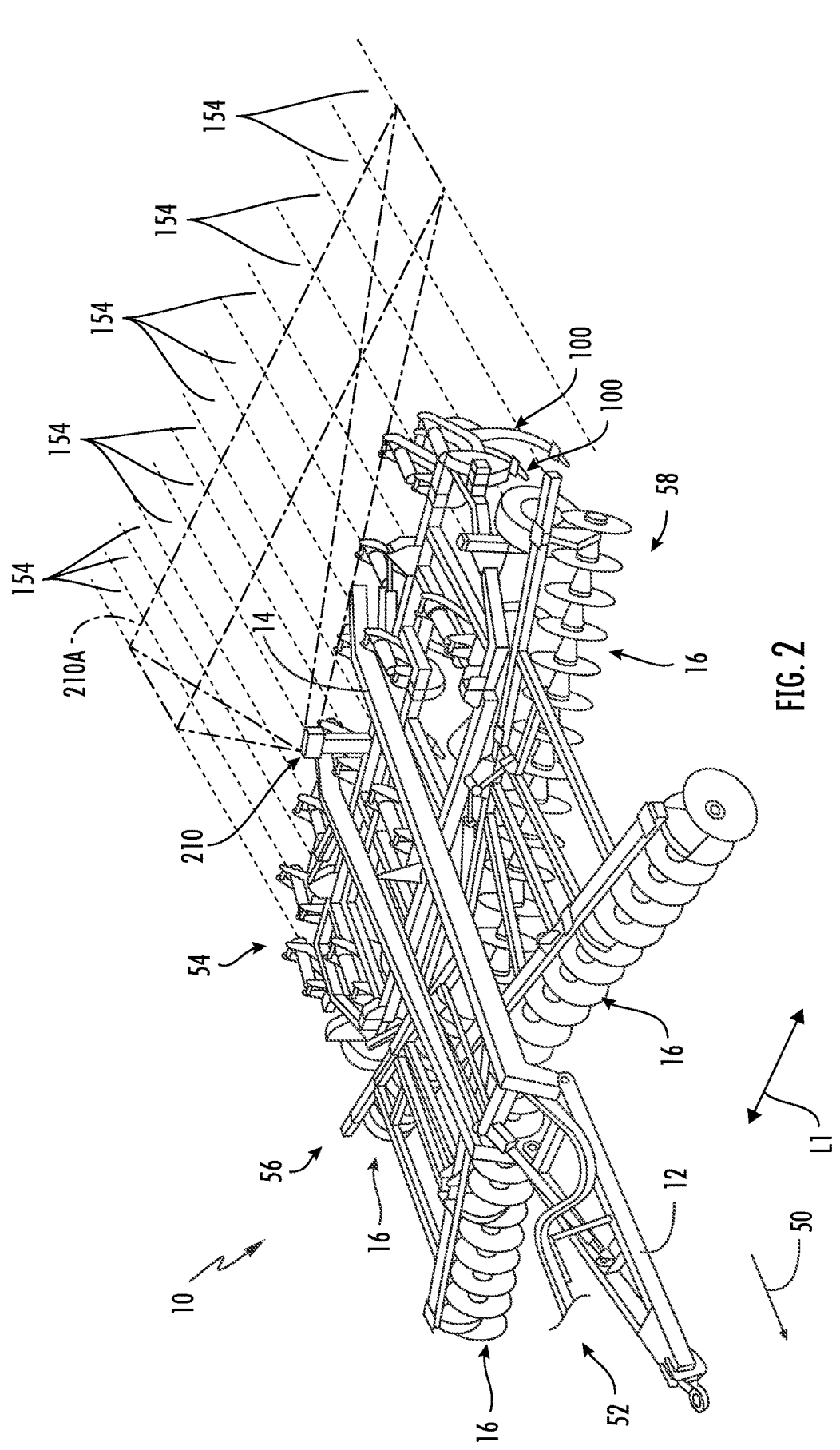
FIG. 2 illustrates a perspective view of the agricultural implement shown in FIG. 1 in accordance with aspects of the present subject matter, particularly illustrating an aft portion of the field rearward of the agricultural implement.

Referring now to the drawings, FIGS. 1 and 2 illustrate differing views of one embodiment of an agricultural implement 10 in accordance with aspects of the present subject matter. Specifically, FIG. 1 illustrates a side view of the agricultural implement 10. Additionally, FIG. 2 illustrates a perspective view of the implement 10, particularly illustrating an aft portion of the field rearward of the implement 10.

As shown, the implement 10 is configured as a tillage implement. However, in other embodiments, the implement 10 may have any other suitable implement configuration, such as by being configured as any other suitable multi-wing implement, including any other suitable tillage implement (e.g., a cultivator) or other implement (e.g., a planter, seeder, sprayer, fertilizer, and/or the like).

As is generally understood, the implement 10 may be used to till a field to prepare the soil by plowing, ripping, turning, and/or the like. In doing so, a portion of the soil residue, such as plant stalks and/or weeds, may be removed during the tilling process. In addition, the soil may be loosened and aerated, which in turn facilitates deeper penetration of roots. The tilling process may also help in the growth of micro-organisms present in the soil and thus, maintain the fertility of the soil.

As shown in FIGS. 1 and 2, the implement 10 includes a tow bar 12 having a coupling mechanism, such as a hitch, used to couple the implement 10 to a towing vehicle, such as a tractor or any other suitable work vehicle. The implement 10 may also include a frame 14 extending longitudinally between a forward end 52 and an aft end 54 of the implement 10, generally parallel to the direction of travel 50. As shown in FIG. 2, the implement 10 also extends along a lateral direction L1 defined between a first lateral side 56 and a second lateral side 58 of the implement 10.

The implement 10 may further include a plurality of ground-engaging tools coupled to or otherwise supported by the frame 14, such as one or more disk blades, plows, chisels, hoe openers, tillage points, rolling baskets, and/or the like. For instance, as shown in FIGS. 1 and 2, the tillage implement 10 includes a plurality of forward disc blades 16, and a plurality of shank assemblies 100, with the shank assemblies 100 being located aft of the forward disc blades 16 on the frame 14. The frame 14 is configured to be actuated relative to the ground between a raised position and a lowered or working position by one or more frame actuators 14A.

As shown in FIG. 1, in one embodiment, each shank assembly 100 may include both a shank 102 pivotally coupled to the implement frame 14 at one end and a shank attachment member 104 coupled to the shank 102 at its opposed end. In the embodiment shown, each shank attachment member 104 corresponds to a tillage point. As is generally understood, the shank attachment members 104 may be configured to enable high-speed operation of the tillage implement 10 while still producing a smooth soil surface. As shown in the illustrated embodiment, the shank assemblies 100 are positioned to till a field at a depth 24 below the field or ground surface, with the depth 24 of the shank attachment members 104 being adjustable by raising or lowering the shank assemblies 100 and/or the portions of the frame 14 relative to the field. For example, the depth 24 may be adjusted, as desired, based on local farming practices and/or field conditions. It should be appreciated that, in other embodiments, each shank attachment member 104 may correspond to any other suitable ground-engaging member beyond a tillage point that is configured to be coupled or attached to the distal end of a shank 102, e.g., chisels, hoe openers, and/or the like.

In accordance with aspects of the present subject matter, the implement 10 may be configured to support one or more sensors that generate or provide data indicative of the surface profile or contour of the field. For instance, in several embodiments, one or more surface profile sensors may be mounted to or supported on the implement 10, with each surface profile sensor 210 having a field of view 210A directed towards the field. Specifically, as shown in FIGS. 1 and 2, each surface profile sensor 210 may be supported relative to the implement 10 (e.g., adjacent to the aft end 54 of the implement 10) such that the field of view 210A of the sensor 210 is directed towards an aft portion of the field disposed rearward of the implement 10 relative to the direction of travel 50 of the implement 10. As such, each surface profile sensor 210 may be configured to generate data indicative of the surface profile or contour of the portion of the field located behind or aft of the implement 10. In this regard, the surface profile sensor 210 may be configured as any suitable device, such as a LIDAR device(s), camera(s) (e.g., a stereo or 3-D camera(s)), radar sensor(s), ultrasonic sensor(s), and/or the like, that allows the sensor 210 to generate point-cloud data, image data, radar data, ultrasound data, and/or the like indicative of the surface profile of the aft portion of the field.

As shown in FIG. 2, in several embodiments, the aft portion of the field located rearward of the implement 10 may be divided along the lateral direction L1 into lateral portions or "lanes" 154. Each lane 154 is associated with a respective one of the shank assemblies 100. Specifically, each lane 154 is aligned along the direction of travel 50 with and worked by a respective shank assembly 100. In general, the surface profile of the aft portion of the field within each of the lanes 154 detected by the sensor(s) 210 will be substantially consistent or uniform during normal operating conditions of the shank assemblies 100 (e.g., when each shank attachment member 104 is still installed relative to the shank 102 of its respective shank assembly 100 and/or when a shank assembly is not experiencing a trip/float event) and, thus, represents a baseline or expected surface profile for the shank assemblies 100. As such, deviation from such baseline surface profile may be indicative of a missing shank attachment member 104 for one or more of the shank assemblies 100 or indicative of a shank assembly 100 experiencing a trip/float event, as will be described in greater detail below.

It should be appreciated that, while the implement is shown as only including or being associated with one surface profile sensor 210, the implement 10 may include or be associated with any other suitable number of surface profile sensors 210, such as two or more surface profile sensors 210. Further, in alternative embodiments, the surface profile sensor 210 may be supported at any other suitable location on the implement 10 and/or a vehicle towing the implement 10 such that the field of view 210A of the sensor 210 is directed towards the aft portion of the field and/or any other suitable portion of the field.

Additionally, it should also be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration or ground engaging tool, e.g., disc blades, plows, chisels, or hoe openers.

Figure 3:
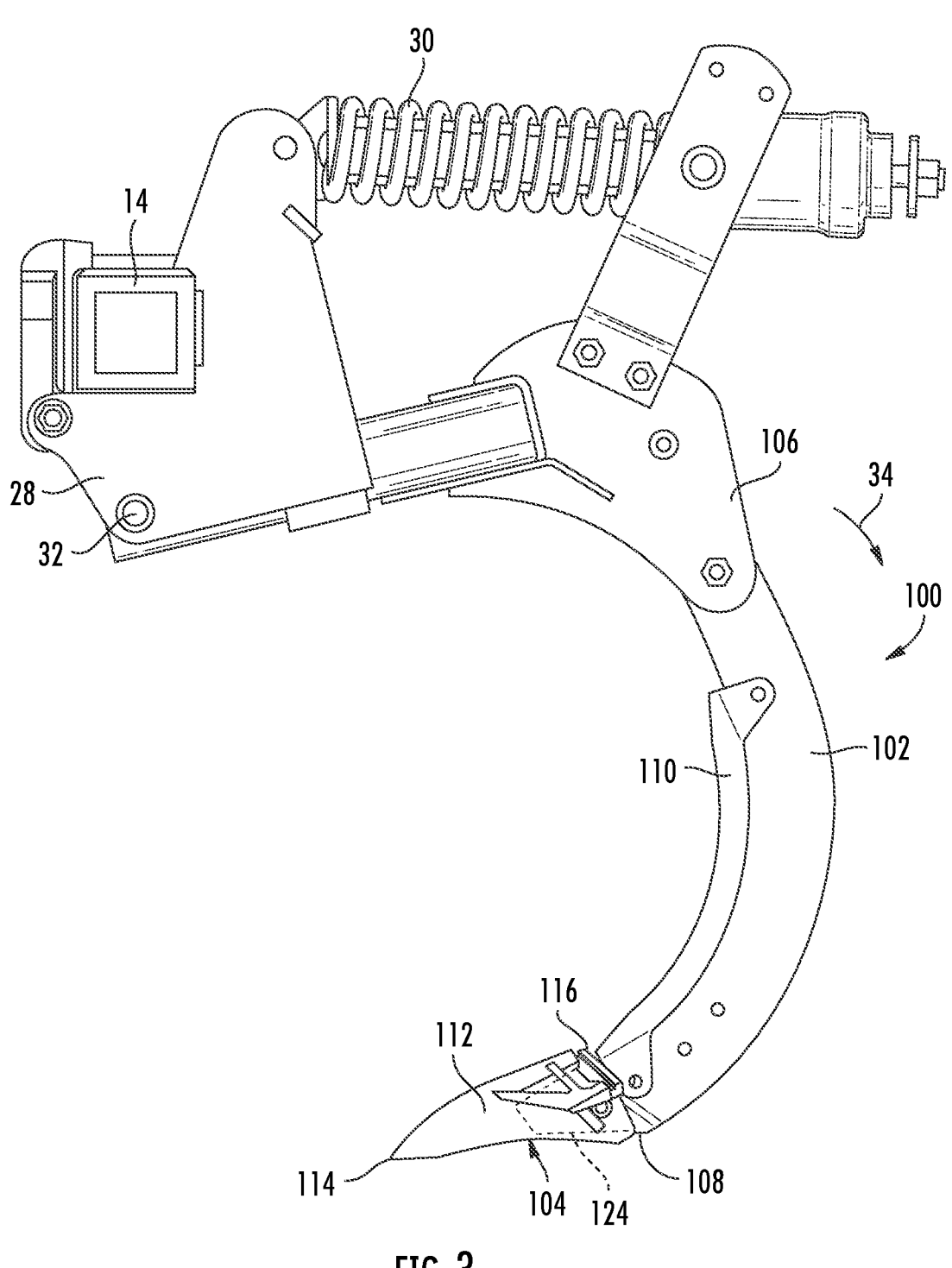
FIG. 3 illustrates a side view of a shank assembly of the agricultural implement shown in FIGS. 1 and 2 in accordance with aspects of the present subject matter, particularly illustrating a shank attachment member installed on the shank assembly.

Referring now to FIG. 3, a side view of an example embodiment of a shank assembly 100 suitable for use with an agricultural implement (e.g., the implement 10 shown in FIGS. 1 and 2) is illustrated in accordance with aspects of the present subject matter. It should be appreciated that, for purposes of discussion, the shank assembly 100 will be described with reference to the tillage implement 10 shown in FIG. 1. However, those of ordinary skill in the art will readily appreciate that the disclosed shank assemblies 100 may be utilized with any suitable agricultural implements having any other suitable implement configuration(s).

In general, as shown in FIG. 3, the shank assembly 100 may include a shank 102 configured to be pivotally coupled to the implement frame 14 and a shank attachment member 104 (e.g., a shank point) configured to be coupled to the shank 102. For instance, the shank 102 may extend lengthwise between a proximal end 106 and a distal end 108, with the proximal end 106 being configured to be coupled to the implement frame 14, e.g., via a mount 28 rigidly coupled to the implement frame 14, and the distal end 108 being configured to be coupled to the shank attachment member 104. The shank attachment member 104 may generally include a body 112 extending lengthwise between a tip end 114 and an opposed retention end 116, where the retention end 116 of the body 112 may generally be configured to allow the distal end 108 of the shank 102 to be coupled to the shank attachment member 104. For instance, in one embodiment, the retention end 116 of the body 112 may include a retention slot 124 defined therein for receiving the distal end 108 of the shank 102.

In some embodiments, the shank 102 is C-shaped, as shown. However, in other embodiments the shank 102 may have any other suitable shape. As shown in FIG. 3, the shank assembly 100 may also include a biasing member 30 (e.g., a spring) coupled between the shank 102 and the mount 28 to bias the shank 102 towards its normal or default ground-engaging position relative to the frame (e.g., the position shown in FIG. 3). For instance, the biasing member 30 may bias the shank 102 downwardly such that the shank pivots about a pivot point 32 defined between the shank 102 and the mount 28 back towards its normal or default ground-engaging position (e.g., in pivot direction indicated by arrow 34) following pivotal movement of the shank 102 in the opposite direction as the shank 102 encounters rocks or other impediments (including compacted soil) in the field during operation of the implement 10. Upward pivoting of the shank 102 about the pivot point away from its normal or default ground-engaging position is generally referred to as a trip/float event, with the difference between a "trip event" and a "float event" generally being characterized by the duration across which the shank 102 is displaced from its normal or default position (e.g., with shorter displacements being referred to as trip events and longer displacements being referred to as float events). Additionally, in some embodiments, the shank assembly 100 may include a shin 110 configured to be coupled to the shank 102 above the shank attachment member 104 to protect the shank 102 from wear.

During normal operating conditions of the shank assembly 100 (e.g., when the shank attachment member 104 is installed relative to the shank 102 and the shank 102 is located at its normal or default ground-engaging position), the shank attachment member 104 will generally work the soil (e.g., by lifting the soil) such that a known or expected surface profile will be located immediately behind the shank assembly 100. For instance, referring now to FIG. 4, a section view of the aft portion of the field rearward of the implement 10 is illustrated, particularly illustrating exemplary surface features that may be created by four respective shank assemblies 100 of the implement 10 during normal operating conditions. As shown, the illustrated section of the aft portion of the field is defined across a plane extending along the lateral direction L1 and a vertical direction V1, with the vertical direction V1 extending perpendicular to both the direction of travel 50 and the lateral direction L1 of the implement 10. A baseline field surface 150 (e.g., which may be formed from soil, residue, and/or mixtures thereof) generally extends laterally across the field and defines a baseline profile or counter during normal operating conditions of the shank assemblies 100.

As indicated above, the aft portion of the field may be divided along the lateral direction L1 into the lanes 154, with each lane 154 corresponding to a lateral portion of the field aligned with and worked by a respective one of the shank assemblies 100. For example, a first lane 154A is aligned with a first one of the shank assemblies 100 in the direction of travel 50 of the implement, with the surface profile of the field within the first lane 154A generally being affected by the operating status of the shank assembly (e.g., the installation status of the shank attachment member 104 of the first one of the shank assemblies and/or whether the shank 102 of the first one of the shank assemblies is experiencing a trip/float event). A second lane 154B is aligned with a second one of the shank assemblies 100 in the direction of travel 50 of the implement 10, with the surface profile of the field within the second lane 154B generally being affected by the operating status of the shank assembly (e.g., the installation status of the shank attachment member 104 of the second one of the shank assemblies and/or whether the shank 102 of the second one of the shank assemblies is experiencing a trip/float event). A third lane 154C is aligned with a third one of the shank assemblies 100 in the direction of travel 50 of the implement 10, with surface profile of the field within the third lane 154C generally being affected by the operating status of the shank assembly (e.g., the installation status of the shank attachment member 104 of the third one of the shank assemblies and/or whether the shank 102 of the third one of the shank assemblies is experiencing a trip/float event). Additionally, a fourth lane 154D is aligned with a fourth one of the shank assemblies 100 in the direction of travel 50 of the implement 10, with surface profile of the field within the fourth lane 154D generally being affected by the operating status of the shank assembly (e.g., the installation status of the shank attachment member 104 of the fourth one of the shank assemblies and/or whether the shank 102 of the fourth one of the shank assemblies is experiencing a trip/float event).

Figure 4:
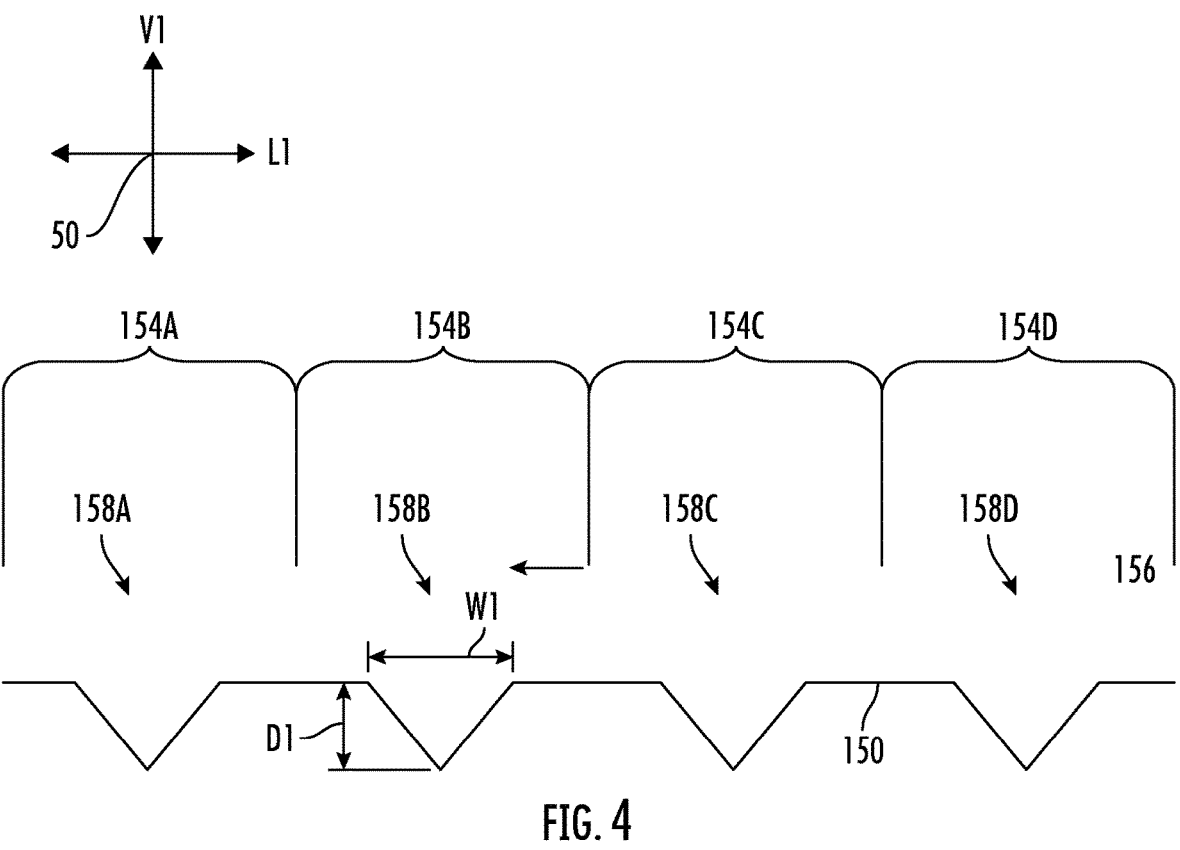
FIG. 4 illustrates a section view of the aft portion of the field shown in FIG. 2 in accordance with aspects of the present subject matter, particularly illustrating exemplary surface features of the field surface created during normal operating conditions of shank assemblies of the implement.

As shown in FIG. 4, a lane profile or contour of each lane 154 includes a surface feature 158 created during operation of the implement 10. For example, the lane profile of the first lane 154A has a first surface feature 158A, the lane profile of the second lane 154B has a second surface feature 158B, the lane profile of the third lane 154C has a third surface feature 158C, and the lane profile of the fourth lane 154D has a fourth surface feature 158D. In general, the surface features 158 are V-shaped due to the V-shaped features that are formed in the soil by the shank attachment member 104 of the shank assemblies 100. It should be appreciated that, while the surface features 158 will be discussed herein with respect to their V-shape, the surface features 158 may have any other characteristic shape depending on the type and/or shape of the shank attachment member 104 installed on each respective shank 102.

During normal operating conditions of the implement 10, the lane profiles of the lanes 154 will have an expected profile or contour. For example, the V-shaped surface features 158 of the lane profiles of the lanes 154 may have a first or baseline width W1 and a first or baseline depth D1. In one embodiment, the baseline width W1 is measured at the opening or top of the V-shaped surface features 158 along the vertical direction V1. However, the baseline width W1 may be measured at any other depth of the surface features 158. In some embodiments, the width of the surface features 158 is greatest at the opening. Further, in one embodiment, the baseline depth D1 is measured between the opening of the surface features 158 and the lowest point of the surface features 158 along the vertical direction V1. However, in some embodiments, the baseline depth D1 may instead be measured between a normal or expected field surface and the lowest point of the surface features 158 along the vertical direction.

Based on the profile or contour of the field surface within the different lanes 154A, 154B, 154C, 154D of the field located aft of the implement 10, the operating status of each shank assembly 100 may be determined. For example, the profile of the field surface may be compared to the baseline field surface 150 to determine when the installation status of one of the shank attachment members 104 has changed, such as by comparing the contour or profile of the surface features within the field to the contour or profile of the surface features 158 associated with the baseline field surface 150. Specifically, in several embodiments, each of the baseline width W1 and the baseline depth D1 of the surface features may be indicative of normal operating conditions of the shank assemblies 100 during which each shank attachment member 104 is in an installed state relative to the shank 102 of its respective shank assembly 100. Accordingly, any deviation from the baseline depth D1 and/or the baseline width W1 may be indicative of a change in the installation status of a given shank attachment member 104.

Similarly, the profile of the field surface may be compared to the baseline field surface 150 to determine when one of the shank assemblies 100 is experiencing a trip/float event, such as by comparing the contour or profile of the surface features within the field to the contour or profile of the surface features 158 associated with the baseline field surface 150. Specifically, in several embodiments, each of the baseline width W1 and the baseline depth D1 of the surface features may be indicative of normal operating conditions of the shank assemblies 100 during which the shank 102 of the respective shank assembly 100 is positioned at its normal or default downward position (i.e., not experiencing a trip/float event). Accordingly, any deviation from the baseline depth D1 and/or the baseline width W1 may be indicative of a change in the operating status of the shank assembly 100.

Figure 5:
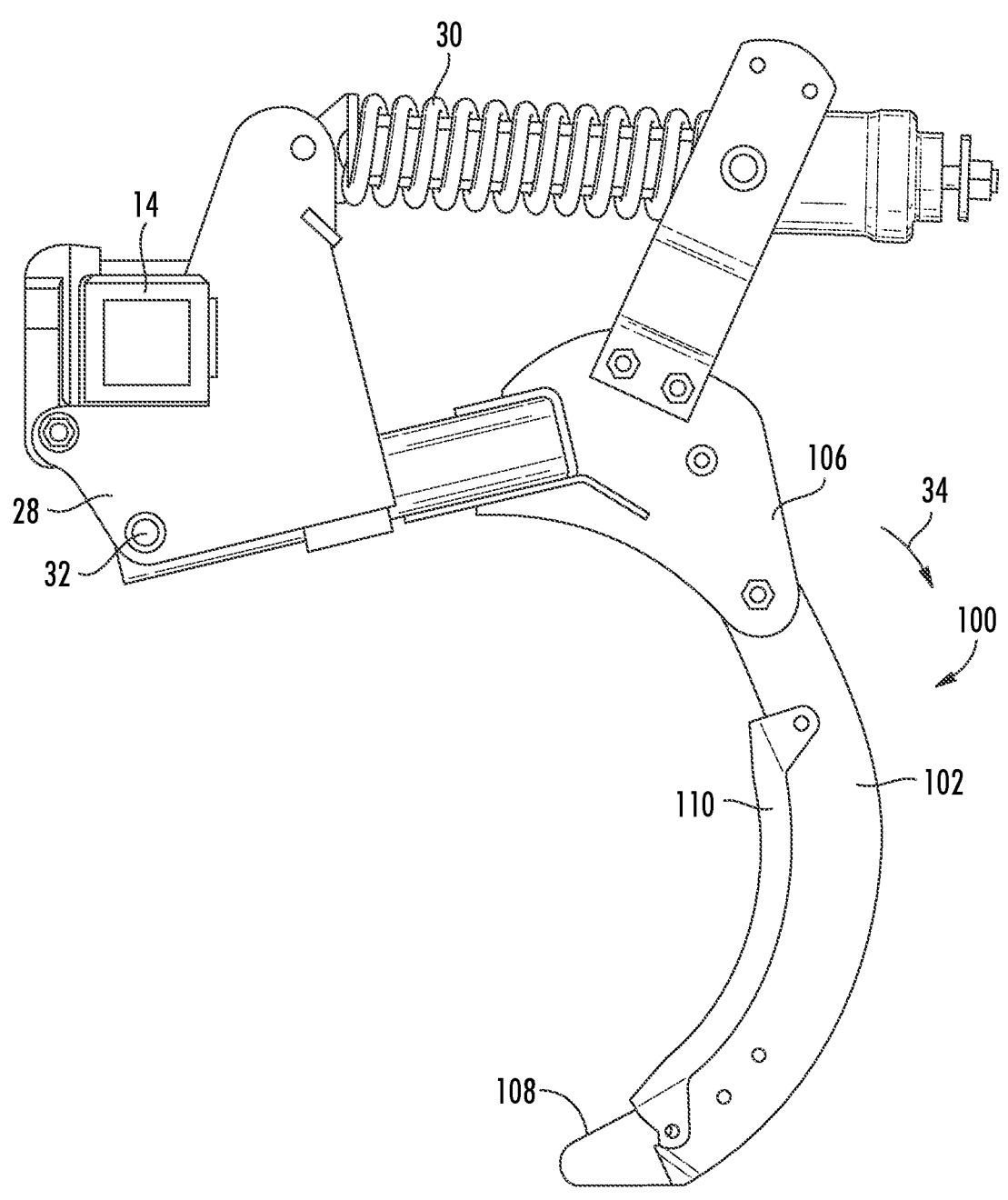
FIG. 5 illustrates another side view of the shank assembly shown in FIG. 3 in accordance with aspects of the present subject matter, particularly illustrating the shank assembly with the shank attachment member missing (e.g., after such member has fallen off or is no longer installed relative to the respective shank)

For instance, referring now to FIG. 5, another side view of the shank assembly 100 shown in FIG. 3 is illustrated in accordance with aspects of the present subject matter, particularly illustrating the shank assembly 100 after its associated shank attachment member 104 has fallen off. As a result, the shank assembly 100 will no longer be capable of working the soil in the typical or expected manner, thereby leading to deviations in the surface profile or contour of the aft portion of the field aligned with such shank assembly 100.

Figure 6:
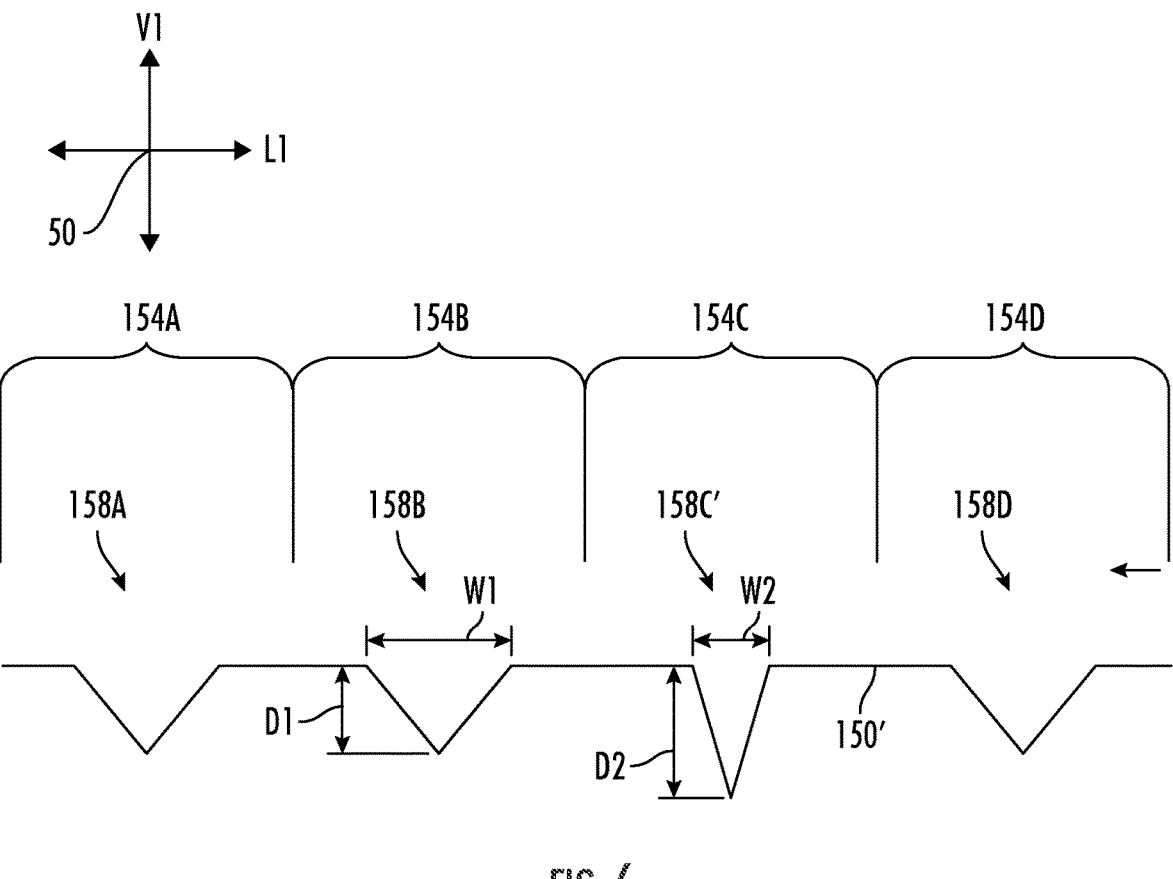
FIG. 6 illustrates an example section view of the aft portion of the field shown in FIG. 2 in accordance with aspects of the present subject matter, particularly illustrating exemplary surface features of the field surface that can be created when one or more shank attachment members have fallen off their respective shanks.

For example, FIG. 6 illustrates an example section view of the aft portion of the field rearward of the implement 10 created when one of the shank assemblies 100 is missing its shank attachment member 104 (i.e., the shank assembly 100 associated with the third lane 154C). As shown, the surface profile of the field surface 150' differs from the surface profile created during normal operating condition of the shank assemblies 100. Particularly, the V-shaped surface feature 158C' of the third lane 154C associated with the third one of the shank assemblies 100 has a second width W2 and a second depth D2, where the second width W2 and the second depth D2 are different than the baseline width W1 and the baseline depth D1. For example, the second width W2 is narrower than the baseline width W1 while the second depth D2 is greater than the baseline depth D2. Such a contour or shape of the surface feature 158C' may generally be indicative of a missing shank attachment member 104, as the soil is no longer being lifted and spread laterally by the associated shank attachment member 104. However, it should be appreciated that missing shank attachment member 104 may result in surface features having other contours or shapes.

It should be appreciated that, although not shown, a similar deviation from the expected or baseline shape or dimensions of the V-shaped surface features will occur when a shank assembly is experiencing a trip/float event. Specifically, a trip/float event will typically result in a V-shaped surface feature that is shallower than the baseline depth D1. Moreover, since trip/float events are generally transient events, the V-shaped surface feature will transition from the expected or baseline shape or dimensions to a shape/dimension expected for a trip/float event and then will transition back to the expected or baseline shape/dimensions once the shank 102 returns back to its normal or default ground-engaging position. As a result, a trip/float event can not only be automatically detected based on the surface profile of the field aft of the shank assemblies, but can be differentiated from the detection of a missing shank attachment member 104.

Figure 7:
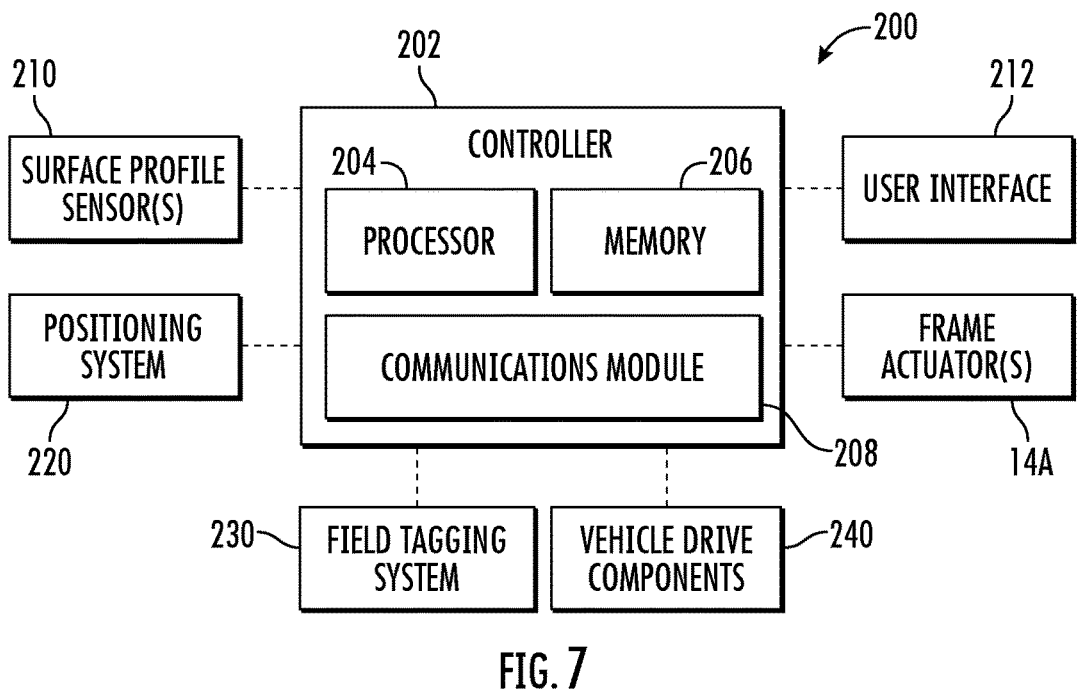
FIG. 7 illustrates a schematic view of one embodiment of a system for monitoring the status of shank assemblies of agricultural implements in accordance with aspects of the present subject matter.

Referring now to FIG. 7, a schematic view of one embodiment of a system 200 for monitoring the status of shank assemblies of an agricultural implement is illustrated in accordance with aspects of the present subject matter. For purposes of discussion, the system 200 will be described herein with reference to the implement 10 described above and shown in FIGS. 1 and 2, the shank assemblies 100 described above and shown in FIGS. 1-3 and 5, and the field surface profiles 150, 150' described above and shown in FIGS. 4 and 6. However, it should be appreciated that the disclosed system 200 may generally be utilized with any suitable implement having any suitable implement configuration. Additionally, it should be appreciated that communicative links or electrical couplings of the system 200 shown in FIG. 7 are indicated by dashed lines.

As shown, the system 200 includes a controller 202 configured to electronically control the operation of one or more components of the agricultural implement 10 and/or the associated work vehicle configured to tow the agricultural implement (e.g., a tractor). In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 (and/or the associated work vehicle) to allow for the disclosed system and method to be implemented without requiring additional software to be uploaded onto existing control devices of the agricultural implement 10.

In some embodiments, the controller 202 may include a communications module or interface 208 to allow for the controller 202 to communicate with any of the various other system components described herein. For instance, as described above, the controller 202 may, in several embodiments, be configured to receive data from one or more sensors of the agricultural implement 10 that is used to detect one or more parameters associated with the operating status of the shank assemblies 100 of the implement 10. Particularly, the controller 202 may be in communication with one or more surface profile sensors 210 configured to detect one or more parameters associated with or indicative of the surface profile of the field at a location aft of the implement 10, which can be used to determine or infer the installation status of the shank attachment members 104 of the implement 10 and/or the occurrence of a trip/float event. In one embodiment, the controller 202 may be communicatively coupled to the surface profile sensor(s) 210 via any suitable connection, such as a wired or wireless connection, to allow data to be transmitted from the sensor(s) 210 to the controller 202.

As indicated above, the surface profile sensor(s) 210 may be installed or otherwise positioned relative to the implement 10 to capture data (e.g., point-cloud data, image data, radar data, ultrasound data, and/or the like) indicative of the surface profile of an aft portion of the field, which, in turn, is indicative of the operating status of the shank assemblies 100, such as the installation status of the shank attachment members 104 relative to the shanks 102 of their respective shank assemblies 100 or the occurrence of a trip/float event. Thus, in several embodiments, the controller 202 may be configured to monitor the operating status of the shank assemblies based on the data received from the sensor(s) 210. For example, the controller 202 may be configured to analyze/process the received data to monitor the surface profile detected across the aft portion of the field relative to a baseline or expected surface profile. For instance, the controller 202 may include one or more suitable algorithms stored within its memory 206 that, when executed by the processor 204, allow the controller 202 to infer the operating status of one or more shank assemblies based on the comparison between the detected surface profile and the baseline or expected surface profile of the field.

In several embodiments, the profile of the field surface 150, 150' is made up of lane profiles within lanes 154, where each lane is associated with a respective shank assembly 100 and has a surface feature 158, 158'. In this regard, when each shank attachment member 104 is properly installed relative to the shank 102 of its respective shank assembly 100 and the shank 102 is located at its normal or default downward position, the surface features 158 of the field surface 150 have a baseline or expected dimension(s) or shape(s), such as a baseline or expected width W1 and/or depth D1 (e.g., as shown in FIG. 4). However, when one of the shank attachment members 104 has fallen off or is no longer properly installed relative to the shank 102 of its associated shank assembly 100 or when one of the shanks 102 has pivoted upwardly relative to its normal or default position during the occurrence of a trip/float event, the profile of the field surface 150' is different from the profile of the field surface 150 formed during operation under normal conditions. Particularly, the surface features of the lane profiles within the lanes 154 may define a different dimension(s) and/or shape(s), such as a different width W2 or depth D2 (e.g., as shown in FIG. 6). As such, in one embodiment, the controller 202 may be configured to compare the dimension(s) and/or shape(s) of the profile of the surface features detected by the surface profile sensor(s) 210 to the dimension(s) and/or shape(s) of the profile of the baseline surface features to assess the operating status of the shank assemblies 100. For instance, when the width and/or depth of the surface features of the field surface detected by the surface profile sensor(s) 210 is not approximately equal to the respective baseline width W1 or the baseline depth D1 of the surface features (e.g., not within a given tolerance of each other), the controller 202 may determine that the associated shank attachment member(s) 104 is no longer properly installed relative to the shank 102 of its respective shank assembly 100 and/or that a shank 102 is experiencing a trip/float event.

The controller 202 may also be configured to perform one or more control actions based on the determination of the operating status of the various shank assemblies 100. For instance, the controller 202 may be configured to indicate to an operator the status of the presence (or lack thereof) of each of the shank attachment members 104 or the occurrence of a trip/float event. For example, in the embodiment shown in FIG. 7, the communications module 208 may allow the controller 202 to communicate with a user interface 212 having a display device, with the display device being configured to display information associated with the operating status of one or more of the shank assemblies. However, it should be appreciated that the controller 202 may instead be coupled to any number of other indicators, such as lights, alarms and/or the like to provide an indicator to the operator regarding the operating status of the shank assemblies.

Is some embodiments, the controller 202 may further be configured to indicate the location within the field at which a given shank attachment member 104 falls off or otherwise becomes decoupled from its respective shank 102 or the location at which a trip/float event has occurred. In one embodiment, the controller 202 may indicate the location by mapping or georeferencing the location at which the controller 202 initially detects or determines that the shank attachment member 104 has fallen off or that a trip/float event is occurring. For example, as shown in FIG. 7, the controller 202 may be in communication with a positioning system 220 (e.g., a GPS-based positioning system), with the positioning system 220 being configured to identify the current location of the implement 10. In such an embodiment, the controller 202 may be configured to monitor the current location of the implement 10 as it simultaneously monitors the operating status of each shank assembly. When it is detected that a given shank attachment member 104 is no longer installed relative to its respective shank 102 or that a trip/float event is occurring, the controller 160 may store the current field location of the implement 10 within its memory 164. The controller 160 may then create an alert or log of alerts to indicate to an operator the location(s) of the missing shank attachment member 104 or trip/float events within the field, which may, for example, be displayed to the operator via the user interface 212. For instance, a field map may be displayed to the operator that maps the location of a missing shank attachment member(s) 104 so that it can be easily retrieved in the future.

As an alternative to mapping or georeferencing the location of a missing shank attachment member 104 or a trip/float event, the controller 202 may be configured to physically tag or mark the field at the location at which the controller 202 initially detects or determines that the shank attachment member 104 has fallen off or that a trip/float event has occurred. For instance, as shown in FIG. 7, the controller 202 may be communicatively coupled to a field tagging system 230 that is configured to tag or mark the field on demand. For instance, upon receipt of a given control command from the controller 202, the field tagging system 230 may be configured to drop or place an object, such as a flag, a locating beacon, etc., onto the field or create a marking on the field (e.g., via paint or via application or any other suitable marking substance) that allows for the location of the missing shank attachment member(s) 104 or the trip/float event to be identified at a later point in time.

In further embodiments, the controller 202 may be configured to perform one or more implement-related control actions based on the determination of the operating status of the shank assemblies. Specifically, in some embodiments, the controller 202 may be configured to control one or more components of the agricultural implement 10 based on the determination that one of the shank attachment members 104 has fallen off or that a trip/float event has occurred. For example, as shown in FIG. 7, the controller 202 may be configured to control one or more frame actuators 14A to move the implement frame 14 into its raised position when it is determined that one or more of the shank attachment members 104 is missing or that a trip/float event has occurred.

Additionally or alternatively, in some embodiments, the controller 202 may be configured to perform one or more vehicle-related control actions based on the determination of the operating status of the shank assemblies. For example, as shown in FIG. 7, in some embodiments, the controller 202 may be configured to control the operation of one or more vehicle drive components 240 configured to drive the work vehicle coupled to the implement, such as the engine and/or the transmission of the work vehicle. In such embodiments, the controller 202 may be configured to control the operation of the vehicle drive component(s) 230 based on the determination of the operating status of the shank assemblies, for example, to bring the work vehicle and implement 10 to a stop when it is determined that one or more of the shank attachment members 104 is missing or when it is determined that a trip/float event has occurred.

It should be appreciated that, depending on the type of controller 202 being used, the above-described control actions may be executed directly by the controller 202 or indirectly via communications with a separate controller. For instance, when the controller 202 corresponds to an implement controller of the implement 10, the controller 202 may be configured to execute the implement-related control actions directly while being configured to execute the vehicle-related control actions by transmitting suitable instructions or requests to a vehicle-based controller of the work vehicle towing the implement 10 (e.g., using an ISObus communications protocol). Similarly, when the controller 202 corresponds to a vehicle controller of the vehicle towing the implement 10, the controller 202 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

Moreover, it should be appreciated that, in addition to analyzing the data provided by the surface profile sensor(s) 210 to determine or infer the operating status of the shank assemblies, the controller 202 may also utilize the surface profile data to assess or identify certain field conditions across the aft portion of the field. For instance, the controller 202 may analyze the surface profile data to identify or detect objects within the field, such as rocks or clumps of soil/residue located within the field aft of the implement 10. In such instance, when a given object is detected, the controller 202 may be configured to identify the location of the detected object within the field, such as by mapping or georeferencing the location of the detected object (e.g., based on the GPS data or other location data provided by the positioning system 220) or by physically tagging or marking the location of the detected object (e.g., by controlling the operation of the field tagging system 230). The mapped/tagged/marked location may then be used to subsequently locate and remove the detected object.

Figure 8:
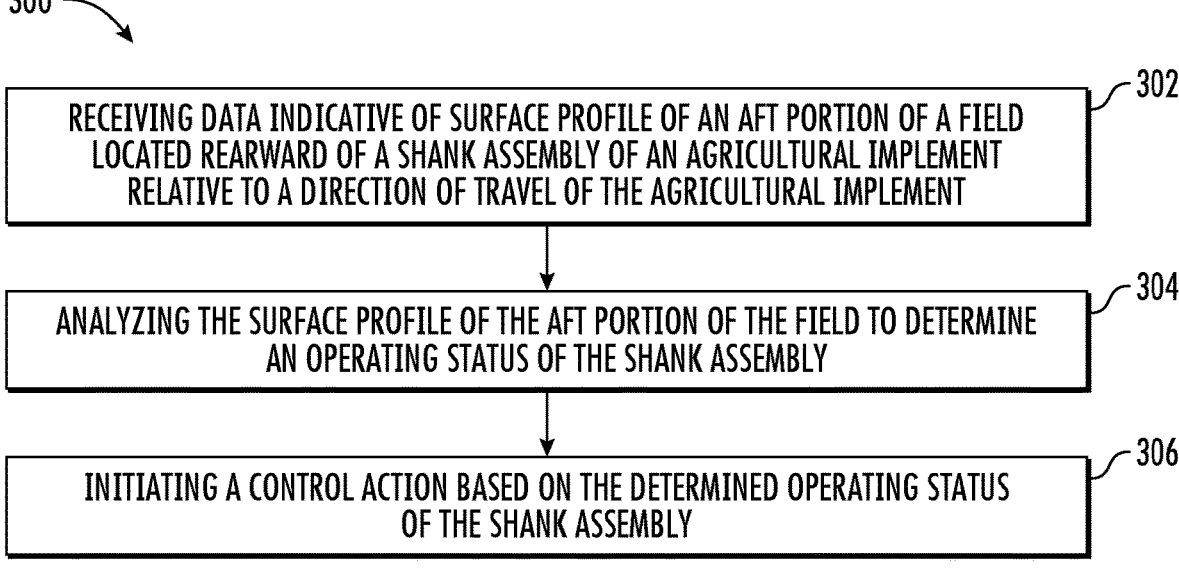
FIG. 8 illustrates a flow diagram of one embodiment of a method for monitoring the status of shank assemblies of agricultural implements in accordance with aspects of the present subject matter.

Referring now to FIG. 8, a flow diagram of one embodiment of a method 300 for monitoring the operating status of shank assemblies of agricultural implements is illustrated in accordance with aspects of the present subject matter. In general, the method 300 will be described herein with reference to the implement 10 shown in FIGS. 1 and 2, the shank assemblies 100 shown in FIGS. 1-3 and 5, the surface profiles shown in FIGS. 4 and 6, as well as the system 200 shown in FIG. 7. However, it should be appreciated that the disclosed method 300 may be executed with implements having any other suitable configurations and/or with systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 8, at (302), the method 300 may include receiving data indicative of a surface profile of an aft portion of a field located rearward of a shank assembly of an agricultural implement relative to a direction of travel of the agricultural implement. For instance, as indicated above, the controller 202 may receive data indicative of a surface profile of the aft portion of the field rearward of a shank assembly 100 of an agricultural implement 10 relative to a direction of travel 50 of the implement 10, such as by receiving such data from an associated surface profile sensor(s) 210.

Moreover, at (304), the method 300 may include analyzing the surface profile of the aft portion of the field to determine an operating status of the shank assembly. For instance, as described above, the controller 202 may compare the surface profile of the aft portion of the field (e.g., a width and/or depth of a surface feature of the aft portion of the field) detected by the surface profile sensor(s) 210 to a baseline surface profile to determine whether or not an associated shank attachment member 104 is installed on the shank 102 of its respective shank assembly 100 or whether a shank assembly is experiencing a trip/float event.

Additionally, at (306), the method 300 may include initiating a control action based on the determined operating status of the shank assembly. For instance, as indicated above, in some embodiments, the controller 202 may provide an indication of the operating status to the operator, such as by controlling the operation of the user interface 212 to display information indicating that one or more of the shank attachment members 104 are missing or information indicating that one or more shank assembles are experiencing a trip/float event. In addition to such operator notifications or as an alternative thereto, the controller 202 may be configured to identify a location of a missing shank attachment member 104 or the occurrence of a trip/float event, such as by mapping or georeferencing the location of the missing shank attachment member 104 or the trip/float event or by physically tagging or marking the location of the missing shank attachment member 104 or the trip/float event within the field. Moreover, in some embodiments, the controller 202 may be configured to execute one or more implement-based or vehicle-based control actions, such as by controlling the operation of an actuator 14A of the implement 10 to adjust the penetration depth 24 of the shank assemblies 100 or by bringing the implement 10 to a stop by controlling the operation of the associated work vehicle.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the status of shank assemblies of agricultural implements, the system comprising:
   a shank assembly configured to be supported relative to an agricultural implement, the shank assembly including a shank configured to penetrate into the ground;
   a surface profile sensor configured to generate data indicative of a surface profile of an aft portion of the field located rearward of the shank assembly relative to a direction of travel of the agricultural implement; and
   a controller communicatively coupled to the surface profile sensor, the controller being configured to monitor the data received from the surface profile sensor and determine an operating status of the shank assembly based at least in part on the surface profile of the aft portion of the field,
   wherein the controller is configured to determine the operating status of the shank assembly by comparing the surface profile of the aft portion of the field to a baseline surface profile,
   wherein the surface profile of the aft portion of the field comprises a lane profile associated with a lane of the field worked by the shank assembly, the lane profile comprising at least one of a lane width or a lane depth,
   wherein the baseline surface profile comprises an expected lane profile associated with the shank assembly, the expected lane profile comprising at least one of an expected lane width or an expected lane depth, and
   wherein the controller is configured to determine the operating status of the shank assembly by comparing the lane profile detected within the field to the expected lane profile associated with the shank assembly.

2. The system of claim 1, wherein the operating status comprises one of an installation status of a shank attachment member of the shank assembly relative to the shank or the occurrence of a trip/float event.

3. The system of claim 1, wherein the controller is configured to determine that a shank attachment member of the shank assembly is no longer installed relative to the shank when a dimension or shape of a surface feature associated with the lane profile detected within the field differs from a dimension or shape of a corresponding surface feature associated with the expected lane profile.

4. The system of claim 1, wherein the controller is configured to determine that the shank assembly is experiencing a trip/float event when a dimension or shape of a surface feature associated with the lane profile detected within the field differs from a dimension or shape of a corresponding surface feature associated with the expected lane profile.

5. The system of claim 1, wherein the controller is further configured to initiate a control action based on the determined operating status of the shank assembly.

6. The system of claim 4, wherein the control action comprises generating an operator notification associated with the operating status of the shank assembly.

7. The system of claim 4, wherein the control action comprises identifying a location at which it was determined that a shank attachment member of the shank assembly is no longer installed relative to the shank or a location at which it was determined that the shank assembly is experiencing a trip/float event.

8. The system of claim 4, wherein the control action comprises adjusting an operation of at least one of the agricultural implement or a work vehicle towing the agricultural implement.

9. The system of claim 2, wherein the shank attachment member comprises a tillage point.

10. A method for monitoring the status of shank assemblies of agricultural implements, the method comprising:

receiving, with a computing device, data indicative of a surface profile of an aft portion of a field located rearward of a shank assembly of an agricultural implement relative to a direction of travel of the agricultural implement, the shank assembly configured to penetrate into the ground;

analyzing, with the computing device, the surface profile of the aft portion of the field to determine an operating status of the shank assembly by comparing the surface profile to a baseline surface profile; and initiating, with the computing device, a control action based on the determined operating status of the shank assembly, wherein the surface profile of the aft portion of the field comprises a lane profile associated with a lane of the field worked by the shank assembly, the lane profile comprising at least one of a lane width or a lane depth, wherein the baseline surface profile comprises an expected lane profile associated with the shank assembly, the expected lane profile comprising at least one of an expected lane width or an expected lane depth, and wherein comparing the surface profile to the baseline surface profile comprises comparing the lane profile detected within the field to the expected lane profile associated with the shank assembly.

11. The method of claim 10, wherein the operating status comprises one of an installation status of a shank attachment member of the shank assembly or the occurrence of a trip/float event.

12. The method of claim 10, wherein it is determined that a shank attachment member of the shank assembly is no longer installed relative to a shank of the shank assembly when a dimension or shape of a surface feature associated with the lane profile detected within the field differs from a dimension or shape of a corresponding surface feature associated with the expected lane profile.

13. The method of claim 10, wherein it is determined that the shank assembly is experiencing a trip/float event when a dimension or shape of a surface feature associated with the lane profile detected within the field differs from a dimension or shape of a corresponding surface feature associated with the expected lane profile.

14. The method of claim 10, wherein initiating the control action comprises generating an operator notification associated with the operating status of the shank assembly.

15. The method of claim 10, wherein initiating the control action comprises identifying a location at which it was determined that a shank attachment member of the shank assembly is no longer installed relative to a shank of the shank assembly or a location at which it was determined that the shank assembly is experiencing a trip/float event.

16. The method of claim 10, wherein initiating the control action comprises adjusting an operation of at least one of the agricultural implement or a work vehicle towing the agricultural implement.

17. The system of claim 1, wherein the lane profile comprises the lane width and the lane depth;

wherein the expected lane profile comprises the expected lane width and the expected lane depth; and wherein the controller is configured to determine that a shank attachment member of the shank assembly is no longer installed relative to the shank when the lane width is narrower than the expected lane width and the lane depth is greater than the expected lane depth.

18. The system of claim 1, wherein the lane profile comprises the lane depth;

wherein the expected lane profile comprises the expected lane depth; and wherein the controller is configured to determine that the shank assembly is experiencing a trip/float event when the lane profile transitions from matching the expected lane profile, to having a dimension where the lane depth is shallower than the expected lane depth, then returns to matching the expected lane profile.

19. The method of claim 10, wherein the lane profile comprises the lane width and the lane depth;

wherein the expected lane profile comprises the expected lane width and the expected lane depth; and wherein determining that a shank attachment member of the shank assembly is no longer installed relative to a shank of the shank assembly comprises the lane width being narrower than the expected lane width and the lane depth being greater than the expected lane depth.

20. The method of claim 10, wherein the lane profile comprises the lane depth;

wherein the expected lane profile comprises the expected lane depth; and wherein determining that the shank assembly is experiencing a trip/float event comprises the lane profile transitioning from matching the expected lane profile, to having a dimension where the lane depth is shallower than the expected lane depth, then returning to matching the expected lane profile.

* * * * *